Nov. 21, 1950

H. T. MELCHOR 2,531,149

FLOOR TILE CUTTING APPARATUS

Filed April 1, 1949

H. T. Melchor
INVENTOR

BY *CA Brow & Co.*
ATTORNEYS

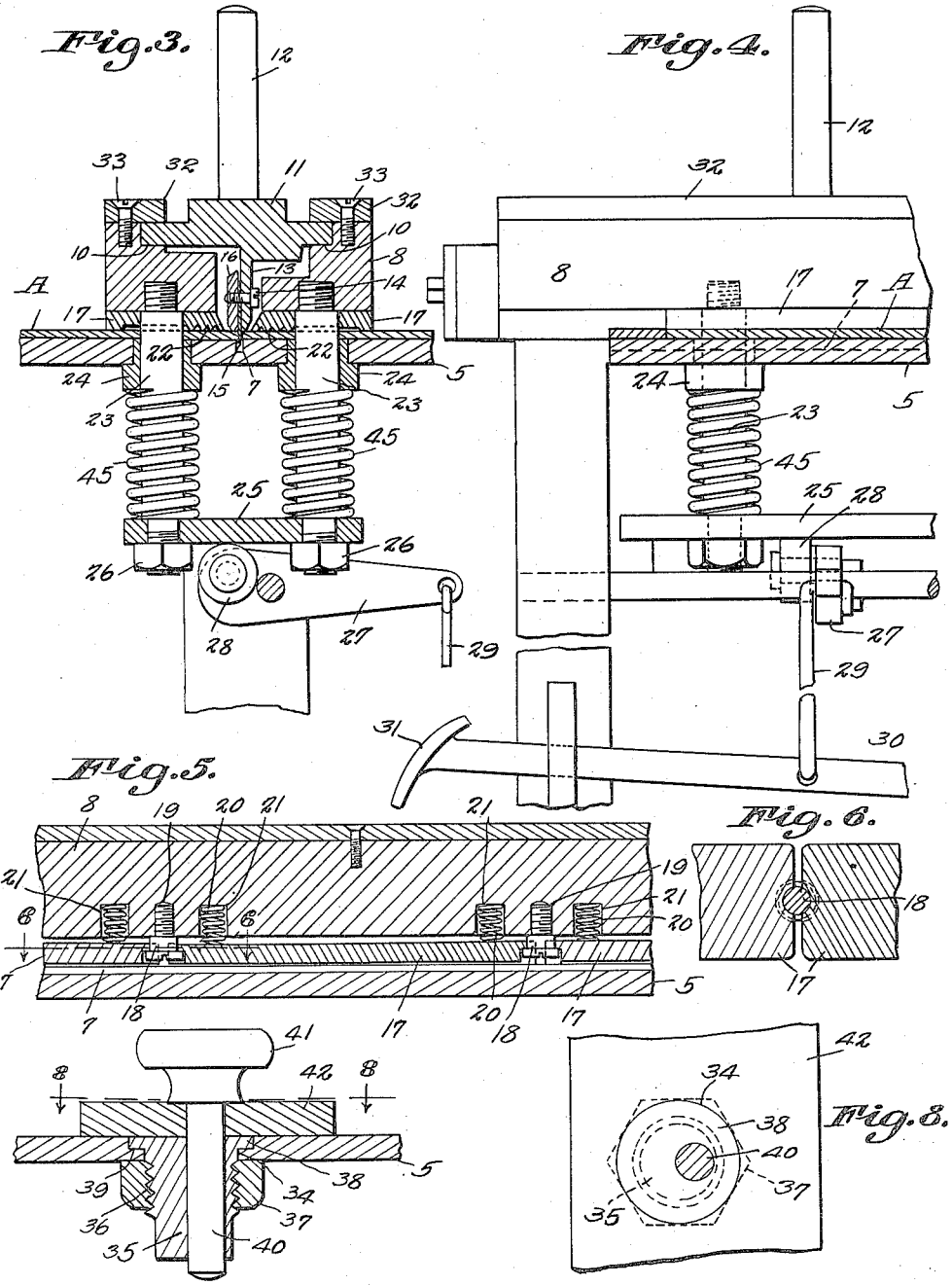

Patented Nov. 21, 1950

2,531,149

UNITED STATES PATENT OFFICE 2,531,149

FLOOR TILE CUTTING APPARATUS

Howard T. Melchor, Albuquerque, N. Mex.

Application April 1, 1949, Serial No. 84,869

4 Claims. (Cl. 164—79)

This invention relates to a cutting apparatus designed primarily for cutting resilient composition floor covering material into tiles of square or diagonal formation of various dimensions, to meet certain requirements of use.

An important object of the invention is to provide an apparatus of this character wherein the material being cut will be securely held in place while the cutting operation takes place, means being provided for supporting the material close to the edge being cut, insuring a clean sharp edge being formed.

Another object of the invention is to provide for a minute adjustment of the adjustable stop to provide for the close tolerance required for the size of the cut squares.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Fig. 3 is a sectional view taken on line 3—3 of Fig. 1.

Fig. 4 is a sectional view taken on line 4—4 of Fig. 1.

Fig. 5 is a sectional view taken on line 5—5 of Fig. 1.

Fig. 6 is a sectional view taken on line 6—6 of Fig. 5.

Fig. 7 is a sectional view taken on line 7—7 of Fig. 1.

Fig. 8 is a sectional view taken on line 8—8 of Fig. 7.

Figure 1:
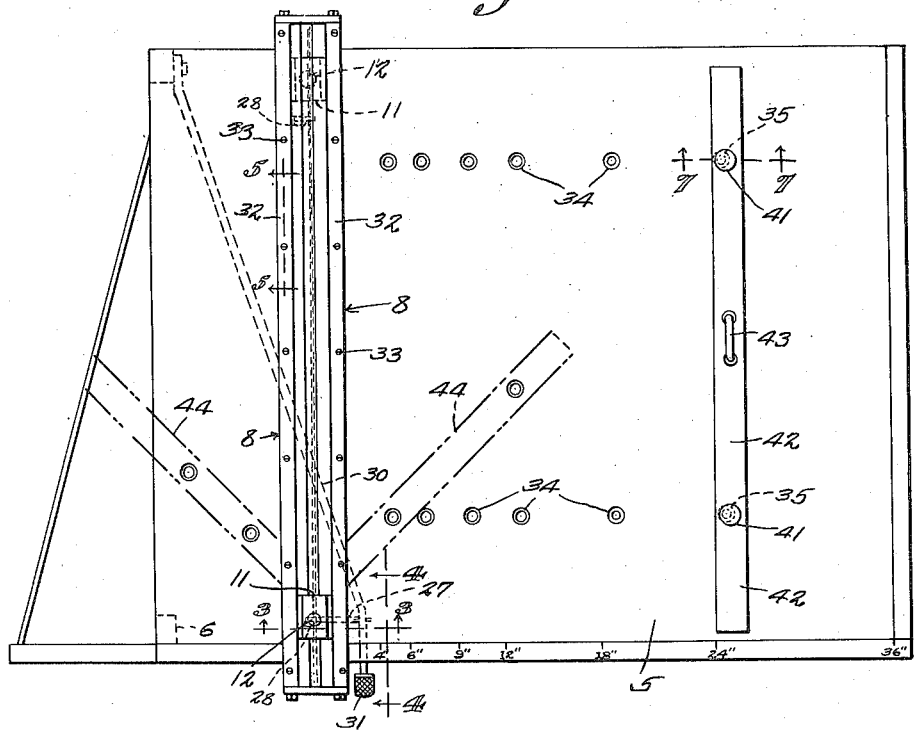
Figure 1 is a plan view of a cutting apparatus constructed in accordance with the invention.
Figure 2:
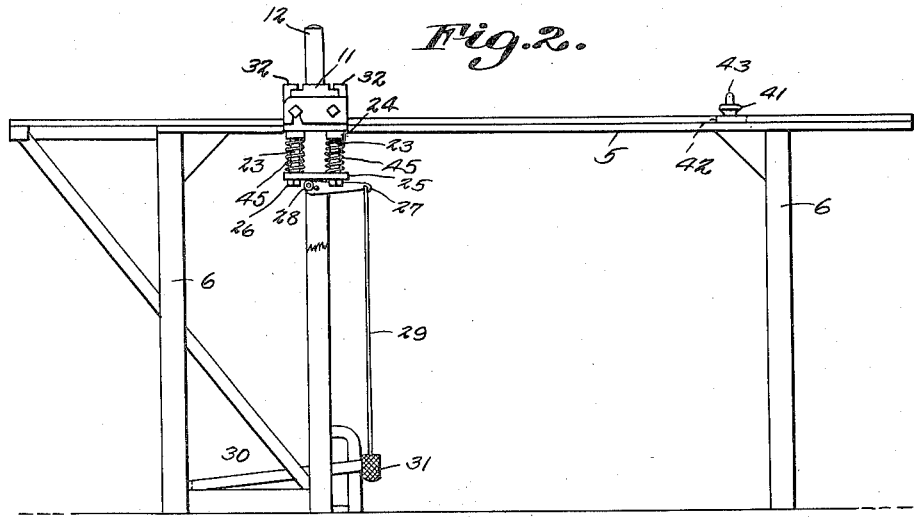
Fig. 2 is a front elevational view of the machine.

Referring to the drawings in detail, the cutting apparatus comprises a table 5 which is supported by means of the legs 6, the table being provided with a transversely disposed groove 7 into which the cutting blade, to be hereinafter more fully described, extends.

The reference character 8 indicates parallel bars that extend transversely of the table, the adjacent inner edges of the bars being disposed in spaced relation with respect to each other, as clearly shown by Fig. 3 of the drawings, providing a space through which the blade 9 moves.

These bars 8 are formed with cut out portions 10 extending throughout the lengths thereof, in which the side edges of the blade carriage 11 operate, the blade carriage 11 being rectangular in formation, so that it will move in a direct line while in operation, to insure a true cutting of the material.

The blade carriage 11 is moved by means of the handle 12 which rises from the blade carriage, to be gripped by the operator and moved.

Extending downwardly from the blade carriage, is the flange 13 that is formed with an opening, through which the screw 14 extends, the screw 14 also passing through the razor blade 15 as well as the plate 16, the blade being clamped between the flange 13 and plate 16, holding the blade in position.

Secured along the lower surfaces of the bars 8, are clamp bars 17, which clamp bars embody a plurality of sections, the ends thereof being spaced apart and formed with recesses to accommodate the heads 18 of the screws 19, which screws have threaded ends fitted in threaded openings of the bars 8, as shown by Fig. 5 of the drawings. Coiled springs 20 are seated in the recesses 21 formed in the bars 8, and act to normally urge the clamp bars 17 downwardly. Because the clamp bars 17 are made up of a plurality of sections, it will be obvious that an even pressure is exerted on the material being cut, throughout the entire width of the material to insure a true cutting of the material.

Teeth 22 are formed along the lower front edges of the bars 17 so that they will better grip the material being cut, which in the present showing is indicated by the reference character A.

The bars 8 are supported at their ends, by means of the posts 23 that have their threaded ends extending into threaded openings of the bars 8, as shown by Fig. 3. These posts 23 extend through bushings 24 that are positioned in openings formed in the table top, the lower ends of the posts being secured to the transverse bar 25 that extends throughout the width of the table, directly under the table. Nuts 26 are secured to the lower threaded ends of the posts 23 and secure the posts in position on the bar 25. As clearly shown by Fig. 3, the posts 23 also move through the clamp bars 17 at the ends of the bars 8 so that the movement of the clamp bars 17 will be independent of the bars 8.

Supported under the bar 25, is the lever 27 on which the roller 28 is mounted, the roller 28 engaging the transverse bar 25.

An opening is formed in the lever 27, in which the link 29 is secured, the link 29 being also connected with the foot lever 30 carrying the pedal 31 at its forward end. Thus it will be seen that when the foot lever is pressed downwardly, the roller 28 contacting with the bar 25 will operate to elevate the bars 8 so that a length of material to be cut into blocks, may be readily inserted under the clamp bars 17.

It might be further stated that the bars 32 that are secured along the upper surfaces of the bars 8, by means of screws 33, engage the blade carriage and hold the blade carriage true to line.

Formed in the upper surface of the table 5, are lines of spaced openings 34 arranged in spaced relation with the opposite side edges of the table. These openings 34 accommodate the cams 35 which are formed with threads 36 on which the nuts 37 operate. These cams are formed with heads 38 that rest on the shoulders 39 formed in the walls of the openings 34.

These cams are provided with eccentrically formed bores disposed longitudinally thereof, the bores accommodating the pins 40 that have heads 41 on the upper ends thereof to permit the pins to be removed and replaced with facility.

The reference character 42 indicates the stop bar that extends across the table top, the pins 40 extending through openings in the bar connecting the bar with the pins. Thus it will be seen that due to this construction the stop bar may be adjusted along the table, by removing the stop bar and positioning it in any of the openings desired to insure the proper length of square being cut. After the major adjustment has been made by positioning the pins 40 in the proper openings, the minute adjustment of the bar for accuracy, may be made by loosening the nuts 37 and rotating the cam slightly in the desired direction to move the stop bar. The nuts 37 may now be tightened to hold the bar in this set position.

In order that the stop bar may be easily manipulated, a handle 43 is provided thereon.

Should it be desired to cut diagonals, bars such as indicated in dotted lines in Fig. 1 of the drawings, may be used and secured to the table top, providing stops against which the edges of the material being cut are positioned. These bars are indicated by the reference character 44.

From the foregoing it will be seen that due to the construction shown and described, I have provided an apparatus for cutting plastic material in sheet form, into squares or diagonals in providing tiles for floor coverings, the cuts being made in such a way as to insure sharp and accurate edges.

It will of course be understood that the springs 44 which are mounted on the posts 33, are of such strength that they will draw the bars 8 downwardly, causing the clamp bars 17 to closely engage the material, holding the material against movement while it is being cut. To release the material after the cut has been made, it is only necessary to press the pedal 31, whereupon the bar 25 is moved upwardly releasing the material.

Having thus described the invention, what is claimed is:

1. An apparatus for cutting sheet material into squares, comprising a table having a transverse groove formed therein, vertically movable guide bars disposed adjacent to opposite sides of the groove, vertically movable posts extending through the table to which the guide bars are connected, said posts being arranged in pairs at opposite ends of the guide bars, a transverse connecting bar connecting the posts at opposite sides of the table, coiled springs disposed between the table and transverse bar, said springs normally drawing the guide bars towards the table clamping the article to be cut, between the guide bars and the table, foot controlled means for elevating the guide bars, clamping bars carried by the guide bars, said clamping bars engaging the sheet material being cut, a carriage movable longitudinally of the guide bars, a cutting blade carried by the carriage and movable in the groove cutting material positioned over the groove, and a handle by means of which the carriage is operated.

2. An apparatus for cutting sheet material into squares, comprising a table having a transverse groove, spaced vertically movable parallel guide bars secured to the table at opposite sides of the groove, clamping bars mounted on the lower surfaces of the guide bars and being movable vertically with respect to the guide bars, each of said clamping bars embodying a plurality of clamping members arranged end to end and movable independently of each other adapted to engage stock being cut, securing the stock against movement, a carriage movable between said guide bars, a blade mounted on the carriage, said blade being movable in the groove cutting material disposed directly over the groove, and a handle by means of which the carriage is reciprocated.

3. Apparatus for severing sheet material comprising a table having a knife-receiving groove therein, material clamping means on the table at opposite sides of the groove, spaced tensioned means carrying said clamping means for normally holding the clamping means in holding engagement with the sheet material, manually operated means for displacing the tensioned means and clamping means relative to the table, means carried by the tensioned means for longitudinal movement thereon, and a knife carried by said last named means adapted to project downwardly into said groove.

4. Apparatus for severing sheet material comprising a table having a transverse groove, clamping bars mounted on the table at opposite sides of the groove and extending substantially across the table parallel to the groove, a vertically movable guide bar secured to the upper side of each clamping bar, a carriage between the guide bars and slidably mounted thereon and carrying a cutter blade depending into said groove and movable longitudinally therein, means for tensioning the guide bars and carriage toward the table for holding the clamping bars in holding engagement with the sheet material, the tensioning means including vertical posts extending through openings in the table and in said clamping bars and anchored at their upper ends in the guide bars, an abutment at the lower ends of said posts and coil springs on the posts between said abutment and the bottom of the table normally urging the guide bars downwardly.

HOWARD T. MELCHOR.

REFERENCES CITED

The following references are of record in the file of this patent:

UNITED STATES PATENTS

| Number | Name | Date |
|---|---|---|
| 218,653 | York | Aug. 19, 1879 |
| 324,633 | Ames | Aug. 18, 1885 |
| 1,742,047 | Moss | Dec. 31, 1929 |

FOREIGN PATENTS

| Number | Country | Date |
|---|---|---|
| 76,743 | Germany | Aug. 9, 1894 |
| 509,979 | Germany | Oct. 15, 1930 |